(12) United States Patent
Soerensen

(10) Patent No.: US 11,286,915 B2
(45) Date of Patent: Mar. 29, 2022

(54) STANDARDIZED PLATFORM ARRANGEMENT OF A WIND TURBINE

(71) Applicant: SIEMENS GAMESA RENEWABLE ENERGY A/S, Brande (DK)

(72) Inventor: Johnny Soerensen, Videbæk (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 81 days.

(21) Appl. No.: 16/477,916

(22) PCT Filed: Nov. 9, 2017

(86) PCT No.: PCT/EP2017/078696
§ 371 (c)(1),
(2) Date: Jul. 15, 2019

(87) PCT Pub. No.: WO2018/133964
PCT Pub. Date: Jul. 26, 2018

(65) Prior Publication Data
US 2019/0368473 A1    Dec. 5, 2019

(30) Foreign Application Priority Data
Jan. 18, 2017   (DE) ...................... 10 2017 200 760.5

(51) Int. Cl.
*F03D 80/80*     (2016.01)
*F03D 13/20*     (2016.01)
*F03D 13/25*     (2016.01)

(52) U.S. Cl.
CPC ............. *F03D 80/82* (2016.05); *F03D 13/20* (2016.05); *F03D 13/25* (2016.05); *F03D 80/88* (2016.05);
(Continued)

(58) Field of Classification Search
CPC .......... F03D 13/20; F03D 13/22; F03D 80/82; F03D 80/88; F03D 13/10; F03D 80/80;
(Continued)

(56) References Cited

U.S. PATENT DOCUMENTS 5,834,916 A    11/1998   Shimogama et al.
6,252,168 B1    6/2001   Van Boekel
(Continued)

FOREIGN PATENT DOCUMENTS

CN         1971037 A      5/2007
DE   102016219413 A1      4/2018
(Continued)

OTHER PUBLICATIONS

International Search Report dated Feb. 13, 2018 for Application No. PCT/EP2017/078696.
(Continued)

*Primary Examiner* — Gisele D Ford
(74) *Attorney, Agent, or Firm* — Schmeiser, Olsen & Watts LLP (57) ABSTRACT

Provided is a platform arrangement of a wind turbine, the platform arrangement including a platform and a frame, wherein the platform is destined to be attached to the interior of a tower or a supporting structure of the wind turbine by the frame, and wherein the platform is a standardized component while the frame is specifically adapted to the dimensions of the specific section of the tower or the supporting structure where the platform arrangement is destined to be mounted to. A modularized unit including several such platform arrangements is also provided. Furthermore, an electrical device including such a modularized unit and corresponding electrical equipment a wind turbine generating electricity including such a unit, and a method of
(Continued)

mounting electrical equipment for controlling a wind turbine at a wind turbine is provided.

12 Claims, 10 Drawing Sheets

(52) U.S. Cl.
CPC ..... *F05B 2240/912* (2013.01); *F05B 2240/95* (2013.01)

(58) Field of Classification Search
CPC ............... E02D 27/425; F05B 2240/14; F05B 2240/913; F05B 2240/912; E04H 12/085
See application file for complete search history.

(56) References Cited

U.S. PATENT DOCUMENTS

| | | | | |
|---|---|---|---|---|
| 9,617,751 | B2* | 4/2017 | Jane Panella | F03D 13/20 |
| 10,683,847 | B2* | 6/2020 | Da Silva | F03D 1/065 |
| 2003/0147753 | A1* | 8/2003 | Ollgaard | E04B 1/1903 |
| | | | | 416/244 A |
| 2004/0260481 | A1 | 12/2004 | Heiligensetzer | |
| 2007/0125037 | A1* | 6/2007 | Meiners | F03D 13/10 |
| | | | | 52/848 |
| 2008/0164966 | A1* | 7/2008 | Findeisen | F03D 13/10 |
| | | | | 336/57 |
| 2009/0088898 | A1 | 4/2009 | Nihei | |
| 2009/0126309 | A1* | 5/2009 | Lyness | F03D 13/20 |
| | | | | 52/650.3 |
| 2009/0211172 | A1* | 8/2009 | Scholte-Wassink | F03D 13/40 |
| | | | | 52/40 |
| 2010/0139180 | A1* | 6/2010 | Meiners | F03D 13/10 |
| | | | | 52/111 |
| 2011/0140437 | A1* | 6/2011 | Vemuri | F03D 80/00 |
| | | | | 290/55 |
| 2011/0173915 | A1* | 7/2011 | Hedegaard | E04G 3/246 |
| | | | | 52/645 |
| 2011/0248506 | A1 | 10/2011 | Ruiz Urien et al. | |
| 2012/0066998 | A1* | 3/2012 | Tobinaga | F03D 13/20 |
| | | | | 52/651.01 |
| 2012/0168116 | A1* | 7/2012 | Mello | F03D 13/10 |
| | | | | 165/47 |
| 2013/0174508 | A1* | 7/2013 | Reed | F03D 13/20 |
| | | | | 52/655.1 |
| 2013/0174509 | A1* | 7/2013 | Reed | E04H 12/08 |
| | | | | 52/655.1 |
| 2013/0298496 | A1* | 11/2013 | Uebbing | F03D 13/10 |
| | | | | 52/745.18 |
| 2014/0075860 | A1* | 3/2014 | Edenfeld | F03D 13/20 |
| | | | | 52/173.1 |
| 2015/0241203 | A1 | 8/2015 | Jordil et al. | |
| 2015/0345463 | A1* | 12/2015 | Nielsen | F03D 13/20 |
| | | | | 416/244 A |
| 2017/0122297 | A1* | 5/2017 | Hansen | F03D 80/00 |
| 2017/0325647 | A1 | 11/2017 | Kwak | |
| 2020/0166022 | A1* | 5/2020 | Soerensen | F03D 80/82 |

FOREIGN PATENT DOCUMENTS

| | | |
|---|---|---|
| EP | 2375058 A2 | 10/2011 |
| EP | 2631479 A2 | 8/2013 |
| GB | 2505192 A | 2/2014 |
| WO | 2014070084 A2 | 5/2014 |
| WO | WO2014070084 A2 | 5/2014 |
| WO | WO 2014070084 A2 | 5/2014 |
| WO | 2015078476 A1 | 6/2015 |
| WO | WO 2015078476 A1 | 6/2015 |
| WO | WO2015078476 A1 | 6/2015 |
| WO | 2018133965 A1 | 7/2018 |
| WO | WO 2018133965 A1 | 7/2018 |

OTHER PUBLICATIONS

PCT Written Opinion corresponding to PCT International Application No. PCT/EP2017/078696.
PCT International Search Report corresponding to PCT International Application No. PCT/EP2017/078696.

* cited by examiner

STANDARDIZED PLATFORM ARRANGEMENT OF A WIND TURBINE

CROSS-REFERENCE TO RELATED APPLICATIONS

This application claims priority to PCT Application No. PCT/EP2017/078696, having a filing date of Nov. 9, 2017, which is based on German Application No. 10 2017 200 760.5, having a filing date of Jan. 18, 2017, the entire contents both of which are hereby incorporated by reference.

FIELD OF TECHNOLOGY

The following relates to a platform arrangement of a wind turbine, the platform arrangement comprising a platform and a frame. The following also relates to a modularized unit comprising several such platform arrangements. Furthermore, the following relates to an electrical device comprising such a modularized unit and corresponding electrical equipment. The following furthermore relates to a wind turbine generating electricity comprising such a unit. Finally, the following relates to a method of mounting electrical equipment for controlling a wind turbine at a wind turbine.

BACKGROUND

Modern wind turbines of industrial size comprise a considerable amount of electrical equipment for operating and controlling the wind turbine. Examples thereof are converters, wind turbine control devices, battery banks, etc. These electrical components are typically arranged at the bottom part of the tower of the wind turbine, or in the case of an offshore wind turbine they may also be located in the supporting structure which supports the tower of the wind turbine. In addition, electrical components may be arranged in other parts of the tower, such as the middle section of the tower or even the top part of the tower of the wind turbine.

According to the known art, these electrical components are arranged at platforms which are customized to the specific wind turbine and even to the specific section of the wind turbine where the platform is destined to be mounted to. This signifies that for each intended use a specific platform needs to be provided. Although the different platforms typically only vary in diameter, it is complex and expensive to provide customized platforms for each section of a wind turbine.

The embodiments seek to overcome this drawback by providing a solution wherein electrical components can be mounted more efficiently at the wind turbine. In particular, the provision of a unit comprising several platforms shall be simplified.

The embodiments also intend to transfer the proposed concept to the provision of platform arrangements in general independent whether the platform arrangement comprises one or several platforms and independent whether the platform arrangements are intended to accommodate electrical or other components of the wind turbine.

SUMMARY

An aspect relates to a platform arrangement of a wind turbine, wherein the platform arrangement comprises a platform and a frame. The platform is destined to be attached to the interior of a tower or the interior of a supporting structure of the wind turbine by means of the frame. The platform is a standardized component while the frame is specifically adapted to the dimensions of the specific section of the tower or the supporting structure where the platform arrangement is destined to be mounted to.

An important aspect of embodiments of the present invention is that a platform arrangement with a standardized platform and a customized frame is provided. The standardization of the platform relates in particular to its uniform dimension.

To give an example, the inner diameter of a tower of a wind turbine may be around six meter at the bottom, but only four meter at the top. Furthermore, if it is an offshore wind turbine being supported by a monopile with a transition piece, the top part of that supporting structure may have an inner diameter of 6.5 meter. Also, assuming that electrical equipment needs to be arranged at different sections of the wind turbine, namely at the top part of the supporting structure but also at the bottom part of the wind turbine tower and at the top part of the tower, then conventionally three different platform arrangements needed to be designed, manufactured and mounted. This is due to the fact that traditionally such a platform arrangement comprised two specifically designed and adapted frames which are welded together at the installation site and inside the supporting structure or the tower. Upon this frame, a platform, for example designed and configures with a grating, is then located.

The embodiments simplify this process by providing platforms of only one size which fit all desired applications. The size of this platform is advantageously taken to have the minimum diameter of the desired applications, which would in this example be the top part of the tower. Then, a separately manufactured frame with an adaptable, i.e. a variable length is taken. As a consequence, only the frame needs to be adapted according to the specific application, i.e. position in the wind turbine.

In embodiments of the invention, each frame comprises a first beam and at least a second beam, wherein the beams are destined to carry the platform and attach it to the interior, in particular an inner wall of the tower or the supporting structure of the wind turbine.

In other words, the frame basically may comprise at least two supporting elements which are shaped as beams. A beam is a simple and efficient way of carrying loads, and, even more importantly, it has a preferred shape for length adaptation. This means that, as the size of the frame, and in particular the length of the beams of the frame, needs to be adjusted, this is done by adjusting the length of the beams.

The frame may well comprise further components, but it comprises at least the first beam and the second beam.

In embodiments of the invention, the first beam and the second beam are arranged substantially perpendicular to each other.

Such an arrangement of the two beams relative to each other is beneficial as an equal arrangement of mounting support units can thus be achieved. This measure is thus suited to provide a maximum possible stability for the mounted modularized unit.

In embodiments of the invention, the diameter of the platform is smaller than the length of the first beam and the diameter of the platform is smaller than the length of the second beam. In a preferred embodiment the length of the first beam and the length of the second beam is the same or substantially similar in length.

As mentioned above, a preferred option is to choose the diameter of the platform according to the existing minimum inner diameter where the platform arrangement, and in particular the platform, shall be mounted. This, however, means that for other sections of the tower or the supporting structure where the platform is foreseen, the standardized platform has a smaller diameter than the diameter of the inner walls at that specific section of the tower or the supporting structure. Although this could be interpreted as a loss of available space of the platforms, the advantage of having a standardized product such as the standardized platform may outweigh the mentioned drawback.

The space between the inner wall of the supporting structure or the tower, respectively, and the platform may however be covered by plates individually adapted in size, e.g. steel plates such as steel grated plates, and optionally placed after platform installation. Such plates can rest on the platform beams and/or other support beams mounted on the platform for such purpose. In alternative, and for safety reasons, each platform may comprise a fence/railing that protects service personnel from stepping outside the platform area.

In embodiments of the invention, the adaptation of the frame to the dimensions of the specific section of the tower or the supporting structure where the unit is to be destined to be mounted to is realized by varying the length of the beams of the frame.

An important aspect of embodiments of the present invention is the variable length of the beams of the frame. This variation of the length of the beams represents a preferred choice for realizing the adaptability, in other words the possibility of the frame to adapt to the concrete dimension of the tower or the supporting structure of the wind turbine.

The variation of the length of the beams can, for example, be achieved by a telescopic structure of the beams. Alternatively, it could also be achieved by simply manufacturing different types of beams with different lengths. It is noted that such a customized beam is deemed to be less complex and costly compared to the provision of an entire customized platform arrangement.

In embodiments of the invention, the platform arrangement comprises an interconnecting device, such as a rail, for facilitating the connection of the standardized platform with the customized beams.

An interconnecting device such as a rail or the like represents a preferred choice for attaching the beams to the platform. The concrete connection of the beams with the platform may be carried out by bolts or screws. Also, a welded connection is possible but seems to be more complex. The interconnecting device has the advantage that the beams can be guided and aligned in a simple and reliable manner.

The embodiments are furthermore related to a modularized unit comprising a first platform and at least a second platform, wherein the first platform and the second platform are spaced apart but connected with each other by a connection element. Each platform is destined to be attached to the interior of a tower or a supporting structure of the wind turbine by means of a frame. The platforms are standardized components while the frames are specifically adapted to the dimensions of the specific section of the tower or the supporting structure where the unit is destined to be mounted to.

In embodiments of the invention, all platforms of the unit have the same standardized shape. This seems to be an optimum exploitation of the rationalization and modularization concept of embodiments of the present invention.

The embodiments are also related to an electrical device for a wind turbine, wherein the electrical device comprises a modularized unit as described above and electrical equipment for controlling the wind turbine, wherein the electrical equipment is arranged at the platforms of the unit.

In other words, instead of a two-step approach of firstly providing and installing the modularized unit and subsequently adding the electrical components and the electrical equipment at this unit, it also seems a good and promising choice to prefabricate the entire electrical device comprising the unit and the electrical equipment. This has the advantage that any cabling of the several electrical components of the electrical equipment and any testing of the electrical equipment can be done beforehand, i.e. before transporting and installing the electrical device at the wind turbine installation site. Thus, further installation time is saved.

The embodiments are also related to a wind turbine for generating electricity, wherein the wind turbine comprises a tower, a supporting structure for supporting the tower, and a platform arrangement comprising a platform and a frame. The platform is destined to be attached to the interior of the tower or the supporting structure of the wind turbine by means of the frame. The platform is a standardized component while the frame is specifically adapted to the dimensions of the specific section of the tower or the supporting structure where the platform arrangement is destined to be mounted to.

In other words, embodiments of the present invention are particularly beneficial for applications in wind turbines. As installation time, i.e. the time needed for erecting the wind turbine, is particularly costly, any time saving during installation is highly relevant. Therefore, using a standardized platform and pursuing the modularized concept is seen as a promising means to reduce complexity for particularly offshore installations. This contributes to the overall goal to bring costs down, in particular in the area of installation of offshore wind turbines.

The platform arrangement may for example be mounted at the top part of the supporting structure, wherein the supporting structure comprises in particular a monopile and a transition piece.

In a preferred embodiment, the platform arrangement is mounted at the top part of the transition piece of the wind turbine.

Alternatively, the modularized unit could be mounted at the bottom part of the tower of the wind turbine.

In addition, or instead of the mentioned locations, other sections of the tower of the wind turbine, such as the center part or the top part of the tower, are also suited for the proposed platform arrangement.

In embodiments of the invention, the wind turbine comprises several platform arrangements being mounted at the tower and/or the supporting structure, wherein each of the platform arrangements is configured as described in one of the embodiments above.

In the case that several platform arrangements exist in one wind turbine, the same standardized shape could exist for all platforms of these several platform arrangements. This allows to even further streamline the process.

The embodiments are furthermore related to a method to mount electrical equipment for controlling a wind turbine at the wind turbine. The method comprises the steps of:
a) inserting a pre-fabricating unit according to one of the described embodiments into the tower or into the supporting structure of the wind turbine by means of a downwards orientated movement,
b) moving the first platform along a mounting support device related to the second platform, c) moving the unit further downwards until the first platform reaches a mounting support device related to the first platform, and d) attach the first platform to the mounting support device related to the first platform.

In other words, the modularized unit is advantageously mounted to the wind turbine by inserting it in one go. Although the process of inserting can be subdivided in multiple steps, the modularized unit is basically inserted into the wind turbine or into the supporting structure of the wind turbine by passing the platforms along the mounting support units. The platforms typically do not reach until the end of the beams. There is typically space at the outer section shown that the unit can pass mounting support units which are attached to the inner walls of the turbine tower of supporting structure of the turbine without being blocked.

If, however, a blocking of a platform occurs, it is still possible to introduce a turning or twisting step such that space between the ends of the beams is provided. Note that in the case of multiple mounting support units which are arranged in a vertical line such a rotation of the unit may even be mandatory.

BRIEF DESCRIPTION

Some of the embodiments will be described in detail, with references to the following Figures, wherein like designations denote like members, wherein.

DETAILED DESCRIPTION

The illustration in the drawings is in schematic form. It is noted that in different figures, similar or identical elements may be provided with the same reference signs.

Figure 1:
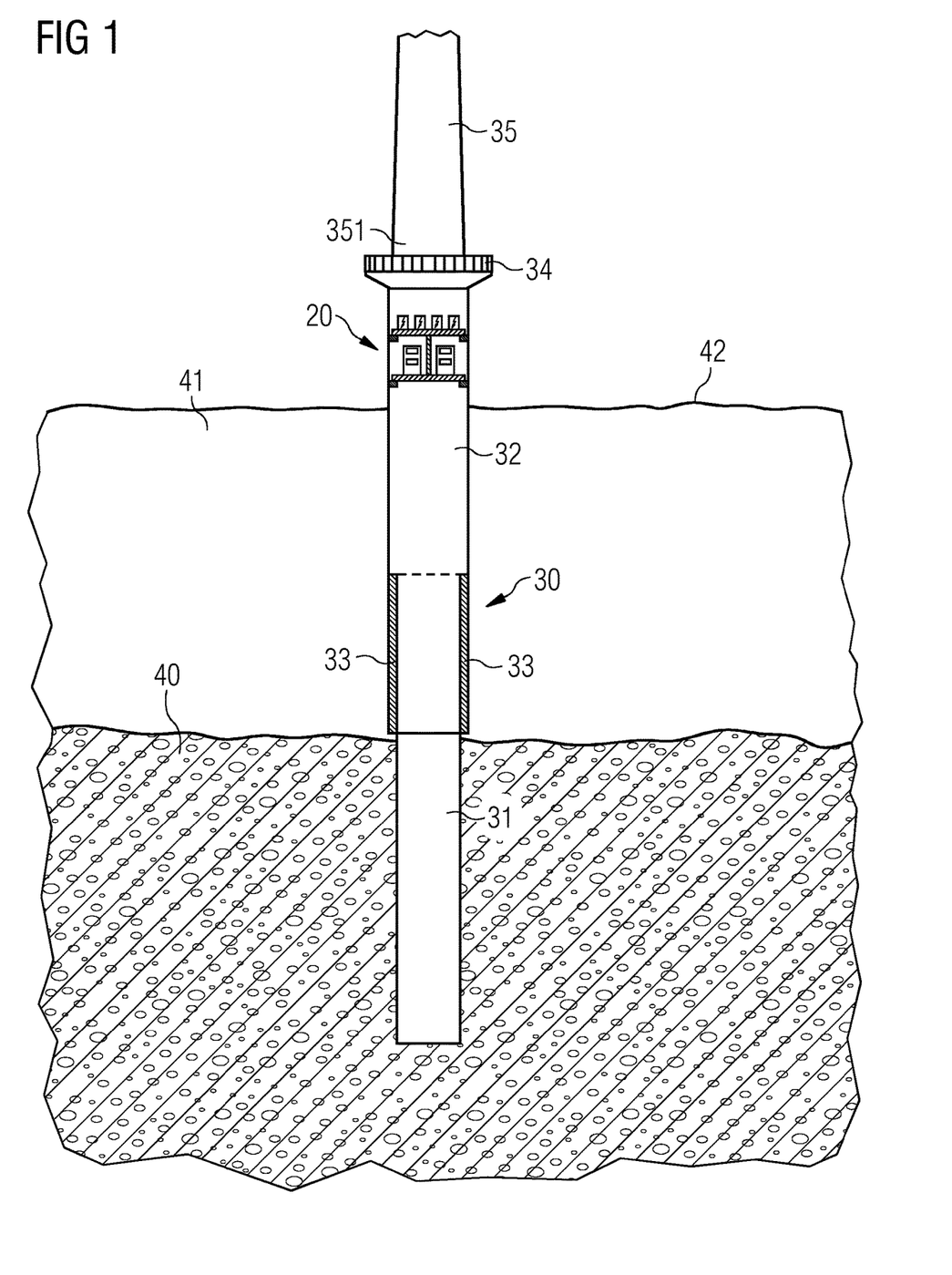
FIG. 1 shows a part of an offshore wind turbine.

FIG. 1 illustrates a part of an offshore wind turbine. In this example, the supporting structure of the wind turbine is realized by a combination of a monopile 31 with a transition piece 32.

The monopile 31 is configured as a hollow pipe which is vertically driven into a seabed 40. To give, exemplarily, dimensions of the monopile 31, the monopile 31 could have a longitudinal extension of twenty to thirty meters of which approximately one half or two thirds are driven into the seabed 40. It is important to drive the monopile 31 considerably into the seabed 40, i.e. to carry out the drilling or driving until a significant depth, in order to ensure that the construction which is subsequently placed on the monopile 31 is stable and robust over a long period of time.

The supporting structure of the wind turbine also comprises the transition piece 32 which is aligned substantially parallel to the monopile 31. In other words, the transition piece 32 is mounted on top of the monopile 31. However, as can be seen in FIG. 1, the supporting structure 30 comprises a rather large connection area between the monopile 31 and the transition piece 32. This relatively large overlap which can easily amount up to a length between ten to fifteen meters is necessary in order to ensure the required stability of the whole arrangement. Although, in theory, different connection types between the monopile 31 and the transition piece 32 are possible, in practice, a grouted connection 33 is a well proven technique to realize this connection. The grouted connection 33 needs to be carried out by a specialized equipment and devices. The choice of the grout and the curing of the grout contributes to the robustness and stability of the entire system. The length of the transition piece 32 is chosen such that it typically protrudes from the sea 41 by several meters. In particular, the distance from the top of the transition piece 32 until the sea level 42 is arranged between two and ten meters.

On top of the transition piece 32, there is provided the tower 35 of the wind turbine. In FIG. 1, only a part of the tower 35, namely the bottom part 351 of the tower 35, is illustrated. In the connection section between the transition piece 32 and the tower 35, there is provided a work platform 34. The work platform 34 is realized as a type of a balcony, which surrounds the substantially circular outer shape of the bottom part 351 of the tower 35. The work platform 34 serves to facilitate access for the service personnel to enter the tower 35 of the wind turbine. This is especially useful for landing and overcome the gap between the vessel and the wind turbine. To this end, the work platform 34 may also provide a set of stairs, which reach down from the work platform 32 close to the sea level 42. This set of stairs may be realized as a ladder or it may more resemble a conventional staircase.

The wind turbine as illustrated in FIG. 1 comprises an electrical device 20 in the top part of the transition piece 32. Note that, for sake of simplicity and for illustration of the inventive concept, only two platforms of the electrical device 20 are illustrated in FIG. 1. In real wind turbines, modules with more than two platforms are usually preferred, in order to provide the space for the diverse electrical equipment to install.

Figure 2:
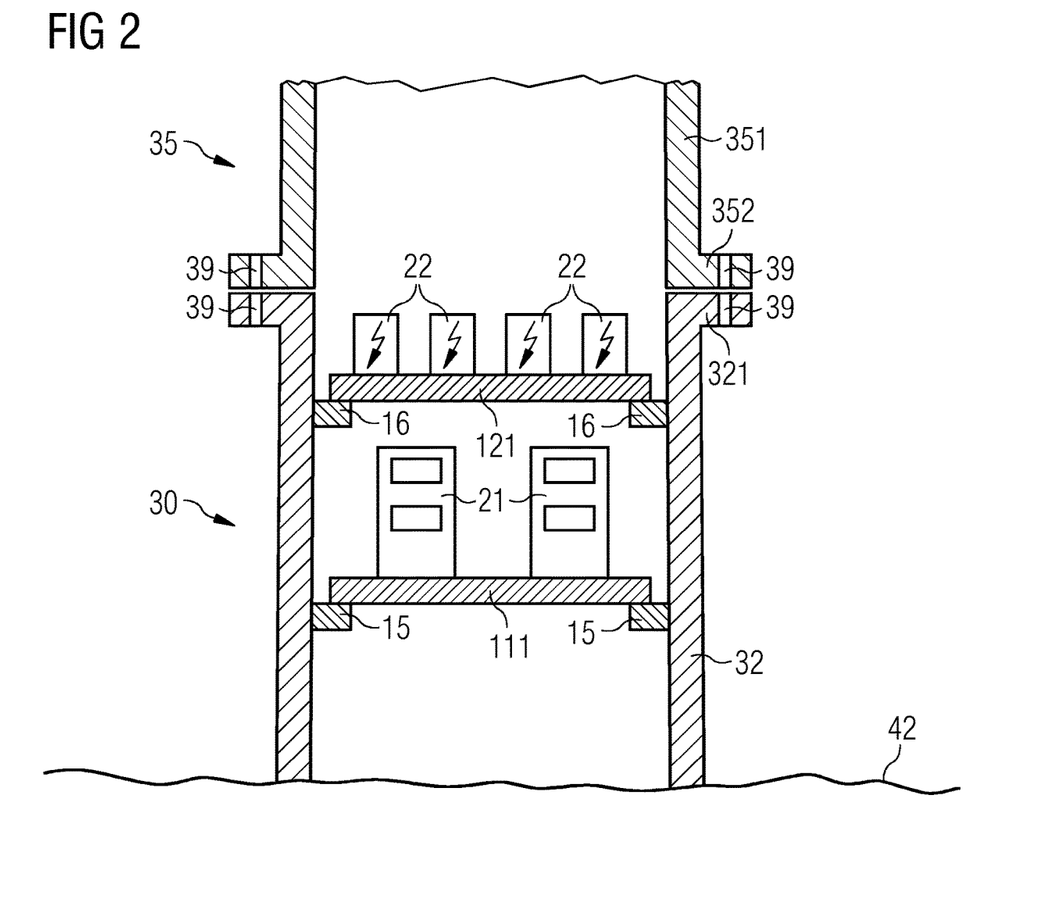
FIG. 2 shows an electrical device of an offshore wind turbine according to the state of the art.

FIG. 2 shows a close-up view of an electrical device of an offshore wind turbine according to the prior art. The supporting structure 30, which in this exemplary case comprises a monopile (not shown) and a transition piece 32, comprises a first mounting support 15 and a second mounting support 16. Both mounting supports 15, 16 are shaped as flanges and are attached to the inner walls of the transition piece 32. Both mounting supports, the first mounting support 15 and the second mounting support 16, are similar in size and shape. A first platform 111 is attached at the first mounting support 15. Likewise, a second platform 121 is arranged and attached to the second mounting support 16. Both platforms, the first platform 111 and the second platform 121, are arranged and prepared to receive and accommodate electrical equipment. In the example as illustrated and FIG. 2, on the first platform 111 there are accommodated two switch boxes 21, while on the second platform 121, there is provided a set of four converters 22.

FIG. 2 also illustrates the attachment of the bottom part 351 of the tower 35 of the wind turbine to the transition piece 32. This attachment is realized by a bolted connection between the tower 35 and the transition piece 32. In particular, the connection is realized by bolts (not shown), which are inserted through bolt holes 39 which are basically configured as through-holes. The bolt holes 39 are arranged at an outer flange comprising one part being referred to as a transition piece flange 321 and one part being referred to as a bottom part tower flange 352.

Figure 3:
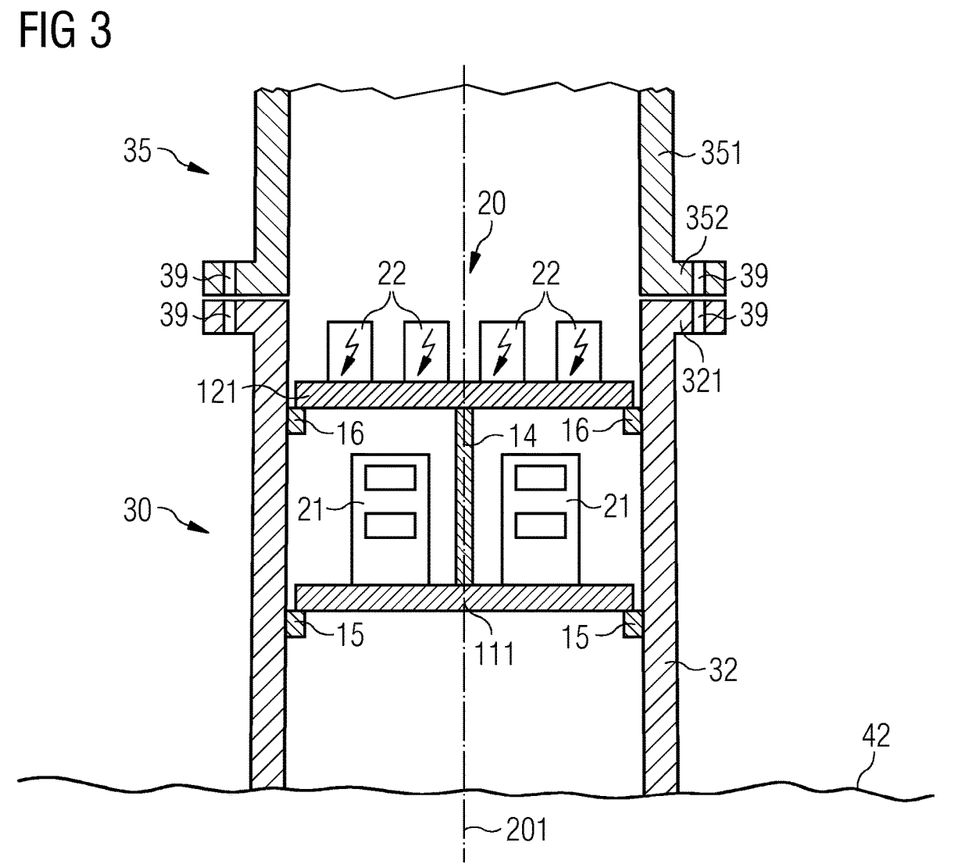
FIG. 3 shows an electrical device of an offshore wind turbine according to embodiments of the invention.

FIG. 3 shows a similar close-up view of an electrical device in an offshore wind turbine, but comprising an electrical device 20 according to embodiments of the invention. The electrical device comprises a vertical axis 201, which may also be referred to as its length axis.

Again, the supporting structure 30 comprises a monopile (not shown) and a transition piece 32. The transition piece 32 comprises a first mounting support 15 and a second mounting support 16. Both mounting supports 15, 16 are shaped as flanges (or "brackets" or "retainers") and are attached to the inner walls of the transition piece 32. Both mounting supports 15, 16 are similar in size and shape. Again, a first platform 111 is attached to the mounting support 15 and a second platform 121 is arranged and attached to the second mounting support 16. Both platforms, the first platform 111 and the second platform 121, are arranged and prepared to receive and accommodate electrical equipment. Again, in the example as illustrated in FIG. 3, two switch boxes 21 are arranged on the first platform 111 and a set of four converters 22 are provided on the second platform 121.

The difference of the electrical device 20 according to embodiments of the invention and illustrated in FIG. 3, compared to the exemplary electrical device according to the prior art as illustrated in FIG. 2 is the provision of a connection element 14 which connects the first platform 111 with the second platform 121. This connection element 14 is sketched as a straight member connecting both platforms 111, 121. As the illustration in the drawings are schematically, the concrete design and shape of the connection element 14 may well vary in practice. However, the key point is that the connection elements constitutes a rigid and robust connection between the two platforms 111, 121, such that the entire electrical device 20 can be loaded into the transition piece 32 of the wind turbine. In other words, only one single step is necessary for mounting the electrical device 20 at the wind turbine.

In contrast to the inventive concept, multiple steps are necessary according to the prior art as the assembly of the electrical device 20 needs to be carried out in the transition piece 32. Descriptively speaking, according to the prior art and the embodiment as illustrated in FIG. 2, in a first step the first platform 111 has to be loaded into the transition piece 32, and in a second step the second platform 121 has to be loaded into the transition piece 32. Additionally, both platforms 111, 121 have to be attached, e.g. bolted or welded, to the mounting supports 15, 16, respectively. Although connection of the platforms 111, 121 with the corresponding mounting supports 15, 16 still needs to be carried out according to the inventive concept, considerable time and effort are saved due to the pre-assembly of the electrical device before mounting it at the wind turbine.

In order to enable the one step mounting procedure of the pre-fabricated and pre-assembled electrical device into the supporting structure or the tower of the wind turbine, a special design of the electrical device is necessary. In particular, a specific design of the platforms 111, 121 is necessary. This specific design will be described and illustrated in more detail by help of several embodiments in the following.

Figure 4:
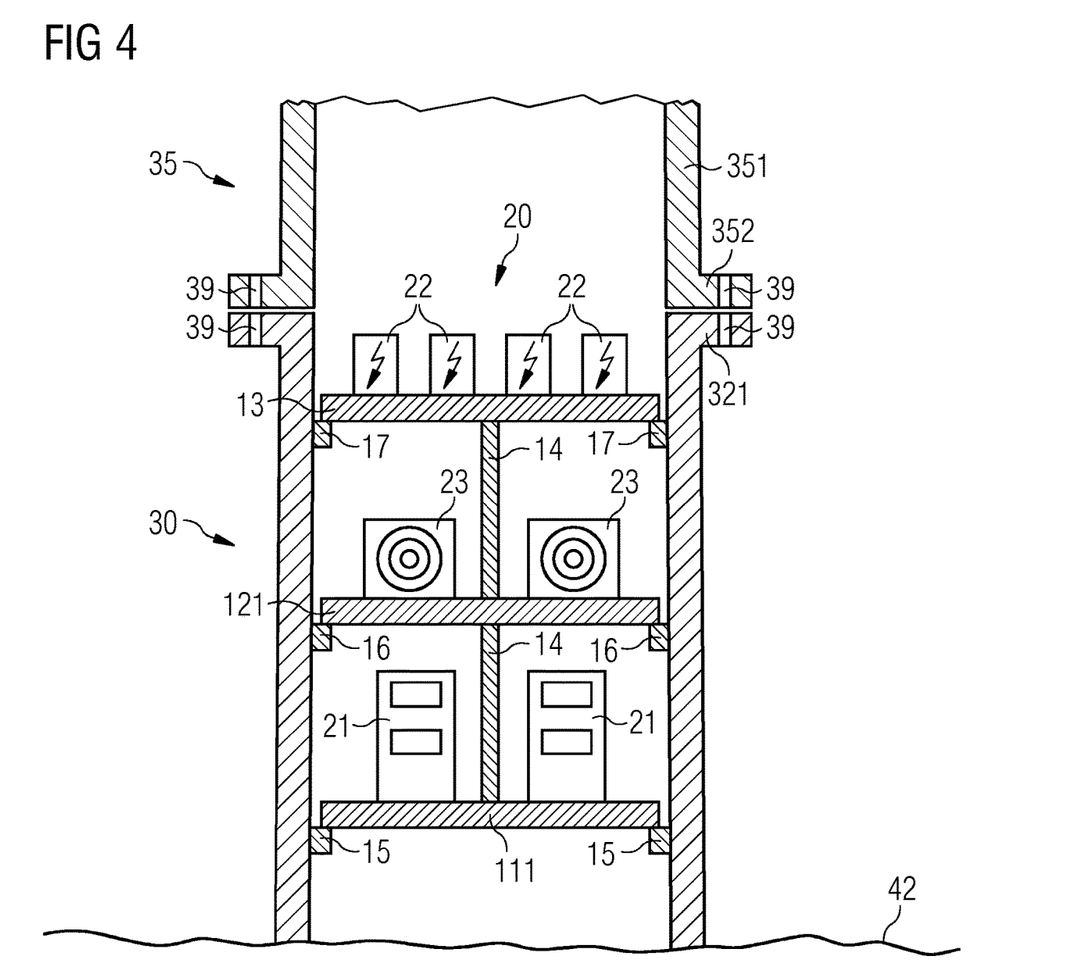
FIG. 4 shows an electrical device of an offshore wind turbine according to embodiments of the invention.

Before coming to the concrete realization of the platforms, FIG. 4 shows that embodiments of the invention are by no means limited to the presence of only two platforms. Moreover, in practice it is preferred that a plurality of platforms, such as three or four or five or six or even more platforms exist at the electrical device or the modularized unit, respectively. Thus, FIG. 4 just shows an example of three platforms being arranged at a transition piece 32 of an offshore wind turbine.

For sake of simplicity, similar or identical elements in FIG. 4 compared to FIG. 3 will not be repeated. Only those elements which are added will be mentioned in the following.

As it can be seen, the electrical device 20 comprises furthermore a third platform 13 which is connected with the second platform 121 by means of the same connection element 14 which already connects the second platform 121 with the first platform 111. The third platform 13 is attached to the inner walls of the transition piece 32 by means of a third mounting support 17. The third platform 13 is arranged and prepared for receiving and accommodating electrical equipment of the wind turbine. In the example as illustrated in FIG. 4, two switchboards 21 are arranged at the first platform 111, two cooling devices 23 are provided at the second platform 121 and a set of four converters 22 are arranged at the third platform 13. Again, a specific design and arrangement of the platforms are necessary if the whole and entire electrical device 20 shall be loaded in basically one step into the transition piece 32.

Figure 5:
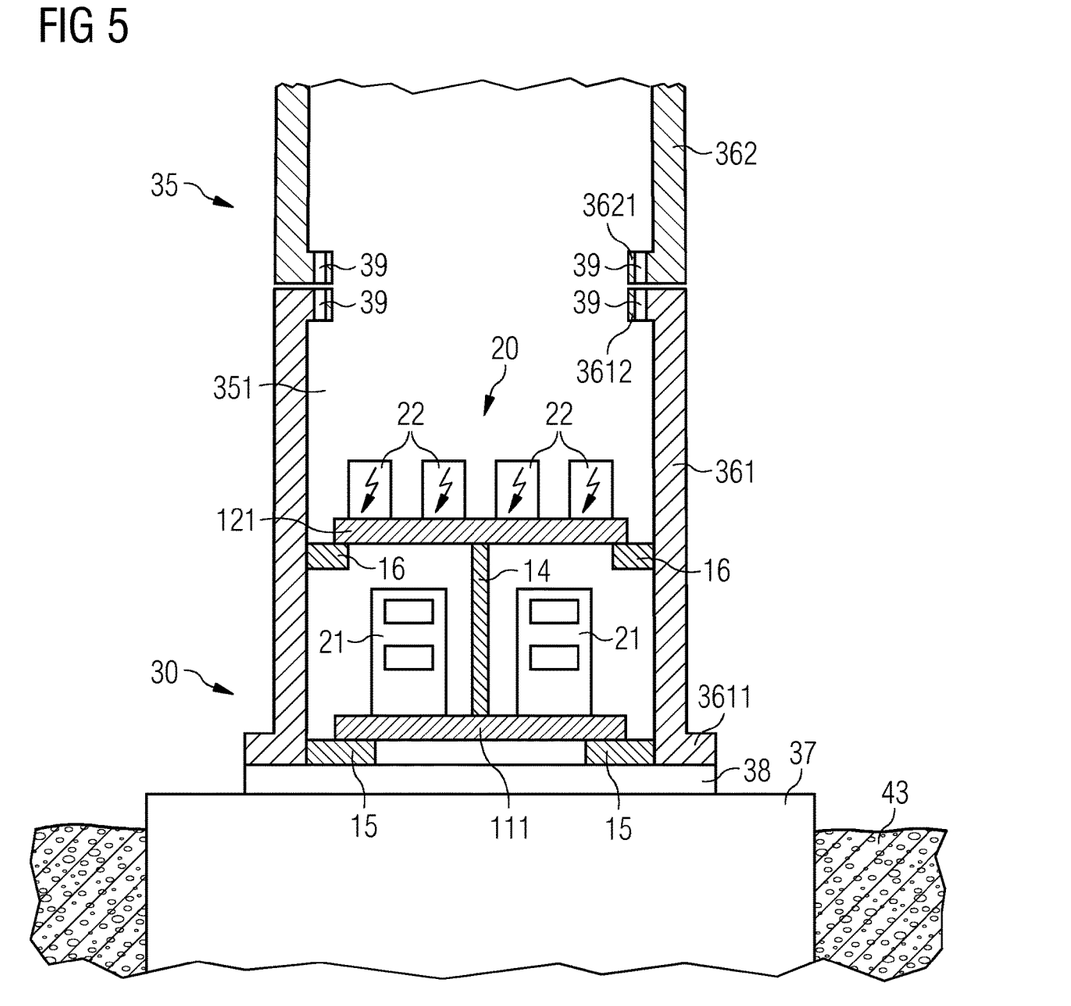
FIG. 5 shows an electrical device of an onshore wind turbine according to embodiments of the invention.

Furthermore, the inventive concept is by no means limited to offshore wind turbines. FIG. 5 shows yet another example of using and benefitting of embodiments of the invention. In this case, an electrical device 20 comprising a first platform 111 which is connected by a connection element 14 with a second platform 121 is provided in the bottom part 351 of a tower 35 of an onshore wind turbine. Thus, it is stressed that in contrast to the embodiments as shown in FIGS. 3 and 4, the electrical device 20 is not provided in the supporting structure but in the tower as such.

Again, the first platform 111 is carried and attached to a first mounting support 15 and the second platform 121 is attached to a second mounting support 16. The tower 35 is a segmented tower comprising a plurality of tower segments. FIG. 5 just illustrates the bottom most tower segment 361 and a second tower segment 362. Both tower segments 361, 362 are connected via a flange which is realized and composed of a first tower segment top flange 3612 and a second tower segment bottom flange 3621. Note that the first tower segment 361 is disposed on a base ring 38 which itself is arranged on top of the foundation 37 of the wind turbine. The foundation 37 together with the base ring 38 constitute the supporting structure of the onshore wind turbine. The foundation structure at a foundation 37 may penetrate several meters into the ground 43 in order to ensure a reliable and safe installation of the wind turbine.

Similar to the advantages and benefits of installing a pre-fabricated electrical device into an offshore wind turbine, the provision of a pre-fabricated electrical device 20 in an onshore wind turbine is beneficial as well. Again, assembly of the electrical device can be made in a preparatory step, for example in a safe and protected environment. Thus, time and efforts out in the field during installation of the wind turbine are kept to a minimum.

Figure 6:
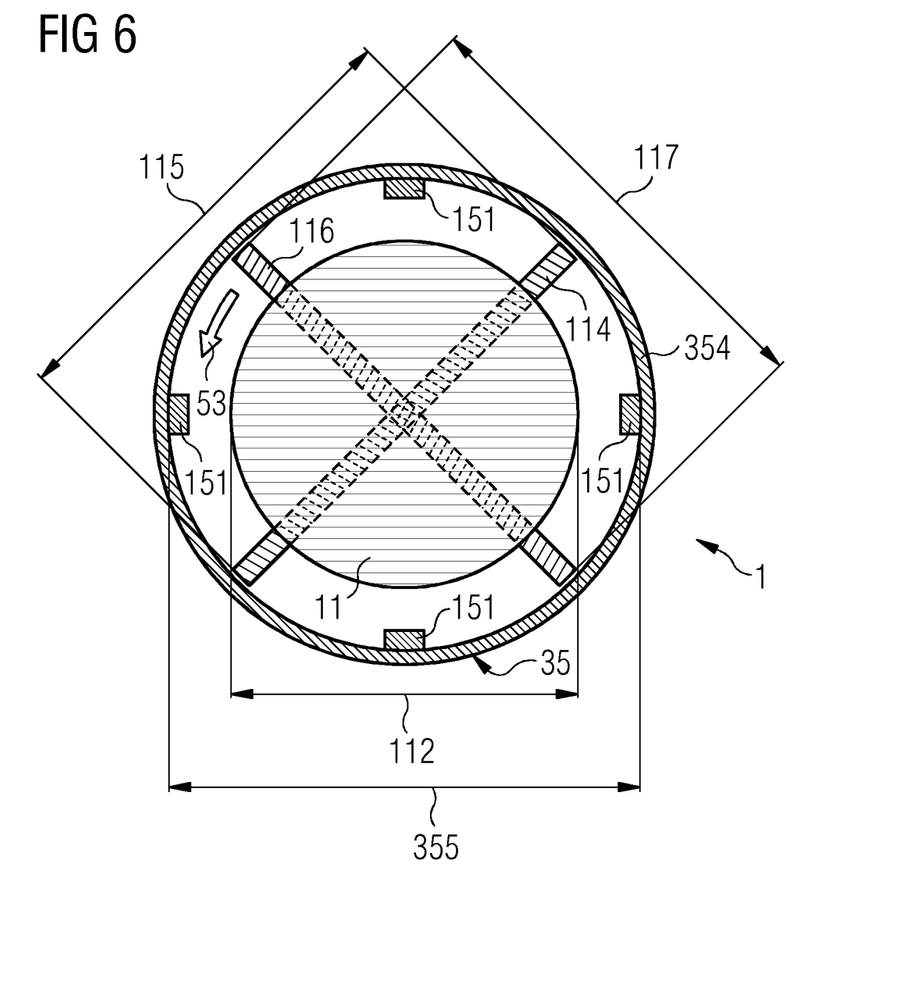
FIG. 6 shows a platform arrangement in a top view according to a first embodiment of the invention.

FIG. 6 shows a top view onto a section of a tower 35 of a wind turbine. In particular, a circular tower wall 354 as an outer confining object can be discerned. The tower wall 354 comprises an outer surface and an inner surface. The inner diameter of the tower is defined as the distance between two opposed sections of the inner surface of the tower wall 354. The inner diameter of the tower is referenced by the reference sign 355 through this patent application. A plurality of mounting support units 151 are attached to the inner surface of the tower wall 354. In the example as illustrated in FIG. 6, four mounting support units 151 are equally distributed circumferentially along the inner surface of the tower wall 354.

FIG. 6 also shows a platform 11 with a substantially circular cross-section in a top view. The diameter of the platform 11 is referenced by the reference sign 112. The platform 11 is disposed upon a first beam 114 and a second beam 116. The length of the first beam is denoted by reference sign 115, the length of the second beam 116 is denoted by reference sign 117. The length of the beams 114, 116 is chosen to be slightly smaller than the inner diameter 354 of the tower 35, but larger than the diameter 112 of the platform 11. This is due to the fact that the platform 11 is a standardized component with a fixed design in particular with a fixed diameter 112. It needs to fit a plurality of application possibilities.

In other words, the platform 11 also needs to find place in a section of a tower which has a smaller diameter than the inner diameter 354 as illustrated in FIG. 6. In contrast to the standardized platform 11, the beams 114 and 116 are adapted specifically to the use at the specific section of the tower 35. This is the reason why the lengths 115, 117 of the beams 114, 116 perfectly fit to the inner diameter 355 of the tower 35. Also note that the beams 114, 116 are designed and arranged such that they fit with the mounting support units 151. The only step which has to be carried out is that the platform arrangement 1 with the beams 114, 116 still needs to be rotated about approximately forty-five degrees in the sense of rotation as indicated by the arrow 53.

Figure 7:
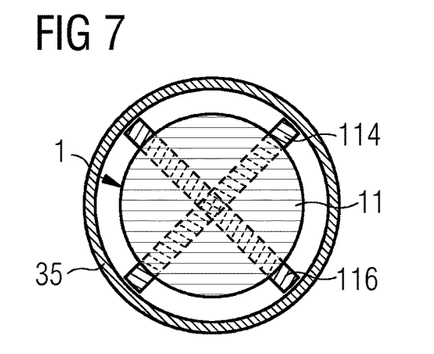
FIG. 7 shows a first platform arrangement in top view according to embodiments of the invention.
Figure 8:
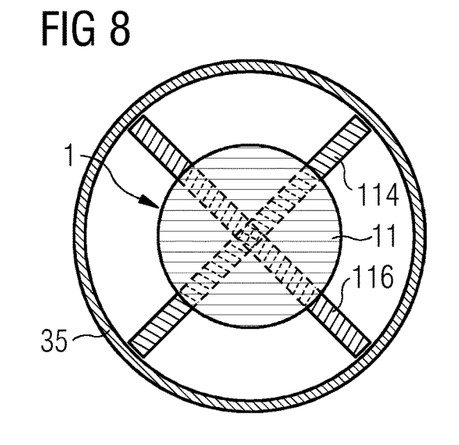
FIG. 8 shows a second platform arrangement in top view according to embodiments of the invention.
Figure 9:
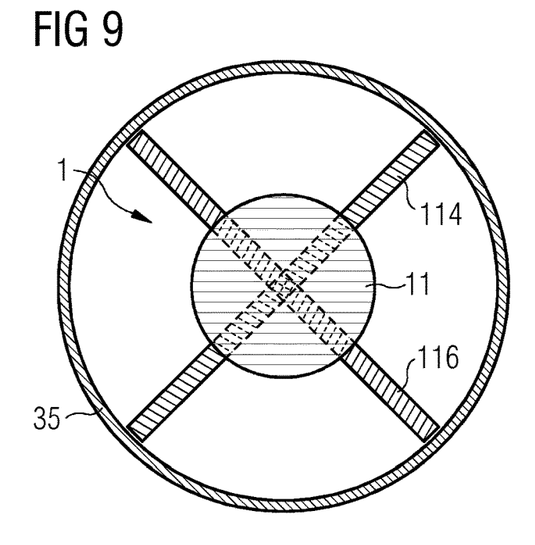
FIG. 9 shows a third platform arrangement in top view according to embodiments of the invention.

FIGS. 7 to 9 show platform arrangements 1 in top views according to further embodiments of the invention. In all three embodiments of FIGS. 7 to 9 the same standardized platform 11 is shown. However, as the diameter of the tower 35 varies from a small diameter in FIG. 7 to a medium-size diameter in FIG. 8 to a large diameter in FIG. 9, the lengths of the beams 114, 116 vary. While the beams 114, 116 are relatively short and only represent a small overlap with regard to the platform 11, the overlap is greater in the embodiment of FIG. 8 and is greatest in the embodiment as illustrated in FIG. 9. These embodiments of FIGS. 7 to 9 illustrate the advantage of using a one-size-fits-all platform 11 and only adapting the beams 114, 116 to the specific size of the inner diameter of the tower where the platform is destined to be mounted to. Note that for the sake of clarity, the mounting support units have been omitted in the FIGS. 7 to 9.

Figure 10:
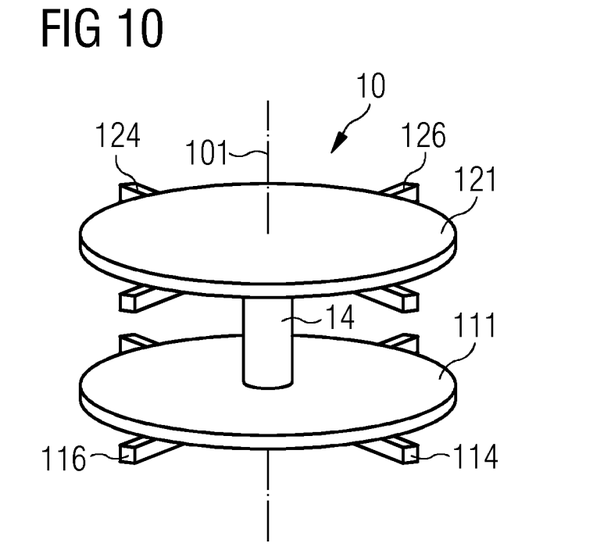
FIG. 10 shows a perspective view of a modularized unit for accommodating electrical equipment for controlling a wind turbine.

FIG. 10 shows a perspective view of a modularized unit 10 for accommodating electrical equipment for controlling a wind turbine. The modularized unit 10 comprises a first platform 111 and a second platform 121. Both platforms 111, 121 are connected with each other by a connection element 14. The connection element 14 provides a fixed distance by which the two platforms 111, 121 are spaced apart from each other. Note that the vertical axis 101 of the modularized unit 10 is also shown in FIG. 10. The vertical axis 101 of the unit 10 extends basically along the length axis of the connection element 14.

The first platform 111 is attached to a first beam 114 and a second beam 116. These beams 114, 116 provide a support of the first platform 111 and realize the attachment of the first platform 111 at a section of the tower or of the supporting unit of the wind turbine. Likewise, the second platform 121 also is connected and attached to a beam 124 and another beam 126. Again these beams 124, 126 are destined to be attached to mounting support units which are themselves attached fixedly to a tower or a supporting unit of the wind turbine.

Figure 11:
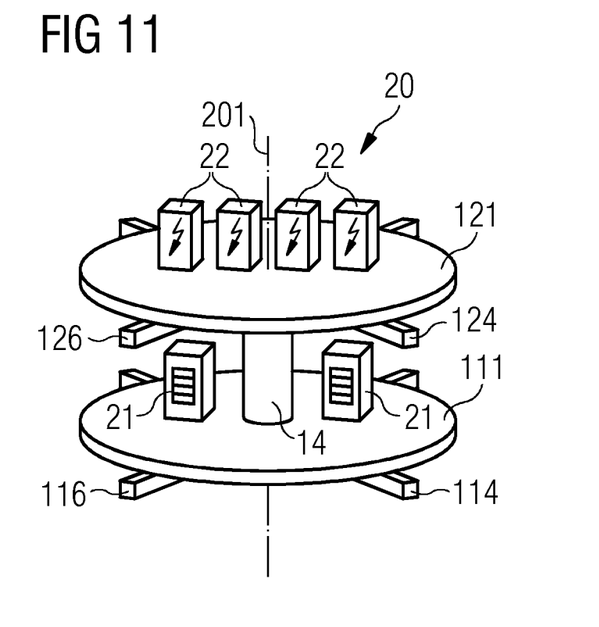
FIG. 11 shows a perspective view of an electrical device comprising the unit of FIG. 10 and the exemplary electrical equipment.

FIG. 11 shows an electrical device 20 which basically consists of the modularized unit 10 as illustrated in FIG. 10 and electrical equipment such as two switchboards 21 which are provided on the first platform 111 and a set of four converters 22 which are provided on the second platform 121. Again the vertical axis 201 of the electrical device 20 is visualized in FIG. 11.

Figure 12:
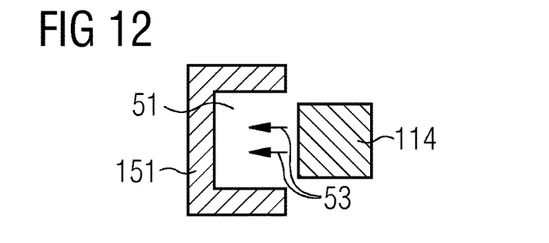
FIG. 12 shows a locking mechanism of a mounting support unit.

FIG. 12 shows a locking mechanism of a mounting support unit.

The locking mechanism is realized by a slot 51 which is provided at the mounting support unit 151. The slot 51 is designed such that the first beam 114 is suited to fit into the slot once that the first beam 114 has been slit into it. In other words, the locking mechanism necessitates a turning or twisting movement of the platform with regard to the beams. If this is carried out, however, the first mounting support unit 151 safely accommodates the first beam 114.

Furthermore, FIGS. 13 to 16 show several embodiments how the sliding of the first beam 114 onto the mounting support unit 151 can be assisted.

Figure 13:
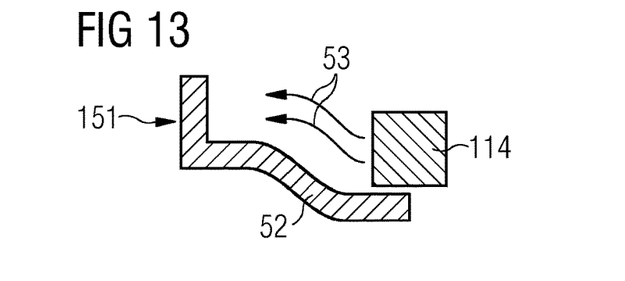
FIG. 13 shows a first embodiment of a sliding assistance for providing guidance for a beam during sliding at a mounting support unit.

In FIG. 13, this is facilitated and realized by a sliding assistance 52. By a movement which brings the first beam 114 to the left and top as shown in FIG. 13, in other words by this movement 53 the first beam 114 is safely brought into place at the mounting support unit 151.

Figure 14:
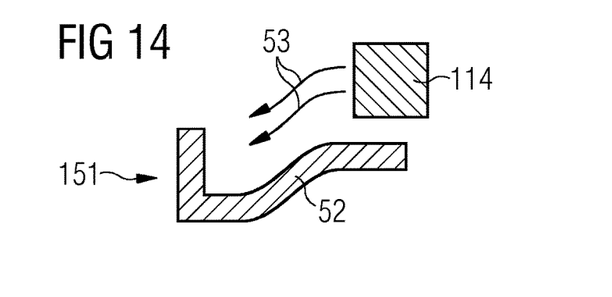
FIG. 14 shows a second embodiment of a sliding assistance for providing guidance for a beam during sliding at a mounting support unit.

FIG. 14 shows a similar concept, however, this time the first beam 114 is guided downwards by the sliding assistance 52.

Figure 15:
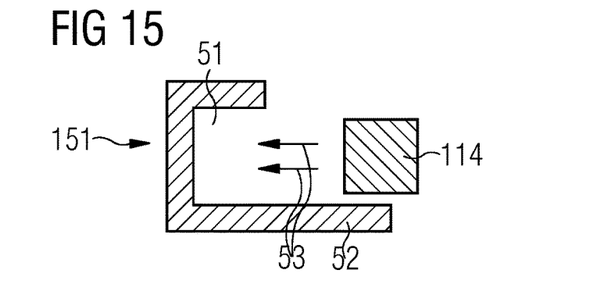
FIG. 15 shows a third embodiment of a sliding assistance for providing guidance for a beam during sliding at a mounting support unit.

FIG. 15 is a combination of the locking mechanism 52 as shown in FIG. 12 and a sliding assistance 52 which in this case is realized as a straight element. Therefore, no downward or upward orientated movement as shown in FIGS. 13 and 14 is necessary.

Figure 16:
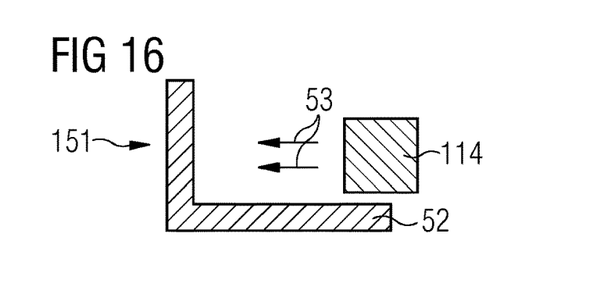
FIG. 16 shows a fourth embodiment of a sliding assistance for providing guidance for a beam during sliding at a mounting support unit.

Finally, FIG. 16 shows a combination of a sliding assistance 52 and a standard mounting support unit wherein again the first beam 114 is moved in the sense of the rotation or direction 53 until the first beam 114 comes to a final stop at the wall of the mounting support unit 151.

FIGS. 17 to 20 show different steps in installing a wind turbine by using embodiments of the present invention.

Figure 17:
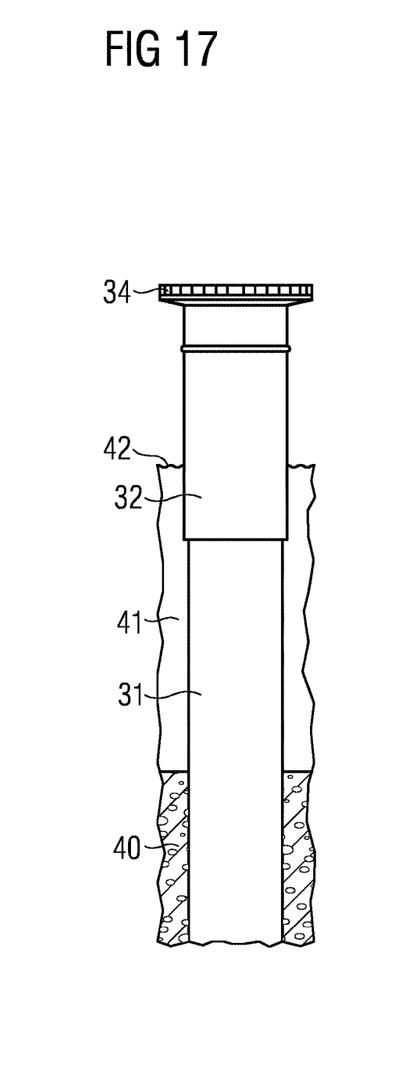
FIG. 17 shows a first step in installing a wind turbine by using embodiments of the invention.

In FIG. 17 a monopile 31 which is driven into the seabed 40 is shown. The monopile is driven into the seabed by a considerable length of several meters in practice in order to ensure a safe and reliable placement of the wind turbine. The monopile 31 is connected with a transition piece 32 by a grouted connection (not shown). The transition piece is designed such that it extends by several meters out of the sea 41. In other words, it projects several meters above sea level 42. At the top of the transition piece 32 a work platform 34 is provided.

Figure 18:
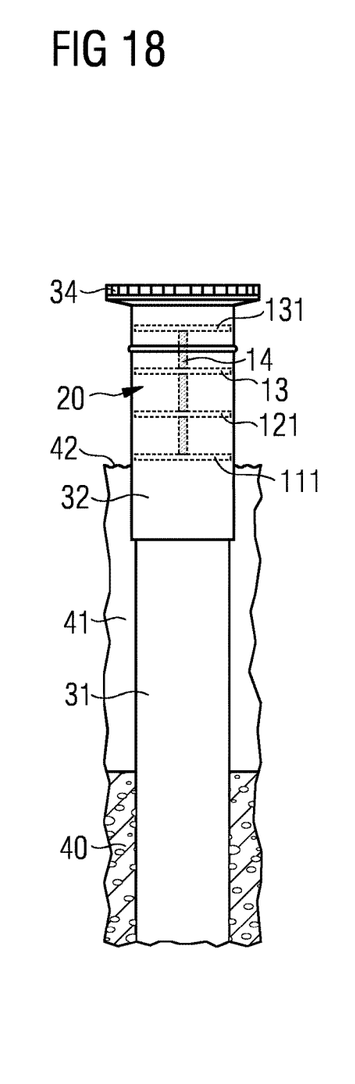
FIG. 18 shows a second step in installing a wind turbine by using embodiments of the invention.

FIG. 18 shows the situation where the electrical device 20 is already installed into the top part of the transition piece 32. Note that in the schematic illustration of FIG. 18, the electrical device 20 is exaggerated in terms of size. The electrical device 20 comprises a first platform 111, a second platform 12, a third platform 13 and a fourth platform 131. All platforms 111, 12, 13, 131 are connected to each other with a connection element 14. These platforms with the connection element 14, i.e. the electrical device 20, is installed in basically one step. In particular, no welding or connection is necessary, but this has been done in a pre-fabrication step at the quay site or elsewhere. In any case, the installation at the installation side offshore can been performed as fast as possible.

Figure 19:
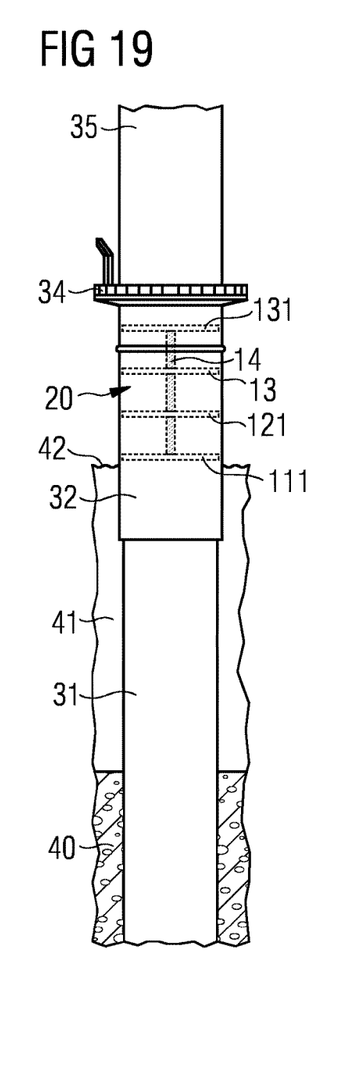
FIG. 19 shows a third step in installing a wind turbine by using embodiments of the invention.

FIG. 19 shows a situation where after insertion of the electrical device 20, a tower 35 of the wind turbine has been installed upon the transition piece 32.

Figure 20:
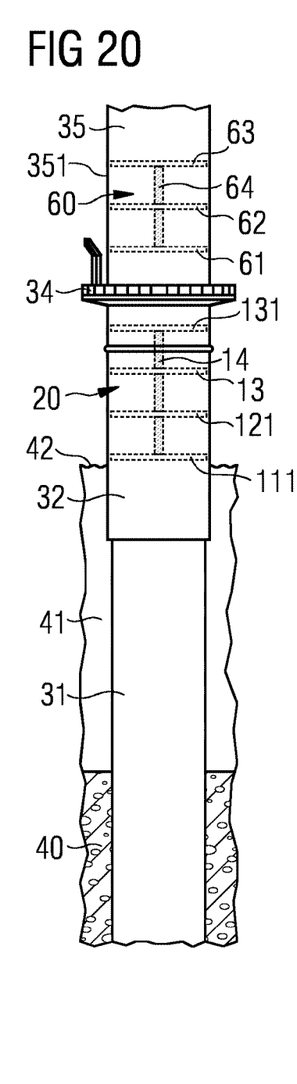
FIG. 20 shows a fourth step in installing a wind turbine by using embodiments of the invention.

Finally, FIG. 20 shows the situation where another electrical device, namely a tower module 60 has been inserted into the bottom part of the tower 351, 35. Also this module which is located at the bottom part of the tower, comprises several platforms namely a first tower platform, a second tower platform and a third tower platform. Also, these tower platforms are connected with each other by connection element 14. Note that for all seven shown platforms in FIG. 20 the same standardized platforms can be used, only the beams of the frame need to be adapted specifically to the position where the platforms shall be attached to the transition piece or the tower, respectively.

In another embodiment, even more platforms are introduced into the tower of the turbine. This is not shown explicitly in the drawings, but it can be well imagined that at the center section of the tower and also in the top section of the tower one or several platforms may be introduced and inserted subsequently. In this case the flexibility regarding the precise diameter of the available space is specifically valuable. It has only been ensured that the platform also fits in this area of the minimum diameter, otherwise only the length of the beams need to be adjusted.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A platform arrangement of a wind turbine, comprising:
    a platform; and
    a frame comprising a first beam having a fixed length and at least a second beam having a fixed length;
    wherein the platform is attached to an interior of a tower or a supporting structure of the wind turbine by means of the frame;
    wherein the platform is a standardized component while the fixed length of the first beam and the fixed length of the second beam is specifically adapted to dimensions of a specific section of the tower or the supporting structure where the platform arrangement is mounted;
    wherein the first beam and the second beam carry the platform and attach the platform to the tower or the supporting structure of the wind turbine via direct contact between the first beam and second beam and a mounting support that is attached to the tower or supporting structure;
    wherein a diameter of the platform is smaller than the fixed length of the first beam and smaller than the fixed length of the second beam.

2. The platform arrangement according to claim 1, wherein the first beam and the second beam are arranged substantially perpendicular to each other.

3. The platform arrangement according to claim 1, wherein adaption of the frame to the dimensions of the specific section of the tower or the supporting structure where the platform arrangement is mounted to is performed by increasing or decreasing the fixed lengths of the first beam and the second beam of the frame.

4. The platform arrangement according to claim 1, wherein the platform comprises an interconnecting device for facilitating a connection of the platform with the first beam and the second beam.

5. A unit comprising:
    a first platform and at least a second platform, wherein the first platform and the second platform are spaced apart but connected with each other by a connection element that establishes a rigid connection between the first platform and the second platform such that the first platform and the second platform are configured to be lowered into an interior of a tower or a supporting structure in a single step, each platform being configured to be attached to the interior of the tower or the supporting structure of the wind turbine by means of a frame, wherein the platforms are standardized components while the frames are specifically adapted to dimensions of a specific section of the tower or the supporting structure where the unit is configured to be mounted to.

6. The unit according to claim 5, wherein all platforms of the unit have a same standardized shape.

7. An electrical device for a wind turbine, wherein the electrical device comprises a unit according to claim 5 and electrical equipment for controlling the wind turbine, wherein the electrical equipment is arranged at at least one of the platforms of the unit.

8. A method to mount electrical equipment for controlling a wind turbine at the wind turbine, the method comprising:
    a) inserting the unit according to claim 5 into the tower or the supporting structure of the wind turbine by means of a downwards orientated movement;
    b) moving the first platform along a mounting support related to the second platform;
    c) moving the unit further downwards until the first platform reaches a mounting support related to the first platform; and
    d) attaching the first platform to the mounting support related to the first platform.

9. The method according to claim 8, wherein the method comprises, after step b) and before step d), e) turning the unit about a vertical axis, wherein the vertical axis is defined as being substantially vertical with regard to planar extensions of the first and second platform, respectively.

10. A wind turbine for generating electricity, the wind turbine comprising:
   a tower;
   a supporting structure for supporting the tower; and
   a platform arrangement comprising a platform and a frame comprising a first beam having a fixed length and at least a second beam having a fixed length, wherein the platform is attached to an interior of the tower or the supporting structure of the wind turbine by means of direct contact between the first beam and the second beam and a mounting support that is attached to the tower or supporting structure;
   wherein the platform is a standardized component while the fixed length of the first beam and the fixed length of the second beam is specifically adapted to dimensions of a specific section of the tower or the supporting structure where the platform arrangement is configured to be mounted to.

11. The wind turbine according to claim 10, wherein the platform arrangement is mounted at a top part of the supporting structure, the supporting structure comprising a monopile and a transition piece and the platform arrangement being mounted at a top part of the transition piece.

12. The wind turbine according to claim 10, wherein the wind turbine comprises at least a second platform arrangement mounted at the tower and/or the supporting structure.

* * * * *